US012601944B2

(12) United States Patent
Wen et al.

(10) Patent No.: US 12,601,944 B2
(45) Date of Patent: Apr. 14, 2026

(54) DISPLAY MODULE, DRIVING METHOD, AND DISPLAY DEVICE

(71) Applicant: HKC CORPORATION LIMITED, Shenzhen (CN)

(72) Inventors: Huayin Wen, Shenzhen (CN); Shasha Zheng, Shenzhen (CN); Baosheng Feng, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 118 days.

(21) Appl. No.: 18/622,864

(22) Filed: Mar. 29, 2024

(65) Prior Publication Data

US 2024/0329458 A1     Oct. 3, 2024

(30) Foreign Application Priority Data

Apr. 3, 2023     (CN) .......................... 202310342463.5

(51) Int. Cl.
*G02F 1/1335* (2006.01)
*G02F 1/13* (2006.01)
*G02F 1/133* (2006.01)
*G02F 1/1343* (2006.01)
*G02F 1/1347* (2006.01)

(52) U.S. Cl.
CPC ...... *G02F 1/133528* (2013.01); *G02F 1/1323* (2013.01); *G02F 1/13306* (2013.01); *G02F 1/134309* (2013.01); *G02F 1/1347* (2013.01)

(58) Field of Classification Search
CPC ............. G02F 1/133528; G02F 1/1323; G02F 1/13306
See application file for complete search history.

(56) References Cited

U.S. PATENT DOCUMENTS

2020/0064666 A1     2/2020   Xin

FOREIGN PATENT DOCUMENTS

| CN | 103293726 | A | * | 9/2013 | ........... G06F 3/0412 |
|----|-----------|---|---|--------|--------|
| CN | 113885239 | A | | 1/2022 | |
| CN | 113985684 | A | | 1/2022 | |
| CN | 215813616 | U | | 2/2022 | |
| CN | 215813619 | U | | 2/2022 | |
| CN | 115528193 | A | | 12/2022 | |
| CN | 217982062 | U | | 12/2022 | |
| JP | 2003107522 | A | * | 4/2003 | |

(Continued)

*Primary Examiner* — Lucy P Chien

(57)     ABSTRACT

A display module, a driving method, and a display device are disclosed. The display module includes a display panel, a backlight module, and a light valve regulator. The light valve regulator includes a first regulating electrode, a first viewing angle control layer arranged on a side of the first regulating electrode facing away from the display panel, a second viewing angle control layer arranged on a side of the first viewing angle control layer facing away from the first regulating electrode, a second regulating electrode, and a first polarizer. The second and first regulating electrode are operative to form an electric field for controlling the first and the second liquid crystal layer. The first polarizer is disposed on a side of the second regulating electrode facing away from the second viewing angle control layer. An absorption axis of the first polarizer is identical with that of the upper polarizer.

17 Claims, 2 Drawing Sheets

100

(56)              References Cited

FOREIGN PATENT DOCUMENTS

| | | | | |
|---|---|---|---|---|
| JP | 2006011451 | A | 1/2006 | |
| KR | 100751312 | B1 * | 8/2007 | ....... G02F 1/133555 |
| WO | 2019006727 | A1 | 1/2019 | |

* cited by examiner

In a wide viewing angle mode, applying an electric field with a set strength between the first regulating electrode and the second regulating electrode, so that the liquid crystal molecules in the first liquid crystal layer of the first viewing angle control layer and the liquid crystal molecules in the second liquid crystal layer of the second viewing angle control layer are positioned at a set angle In an anti-peeping mode, applying no electric field between the first regulating electrode and the second regulating electrode, so that the liquid crystal molecules in the first liquid crystal layer of the first viewing angle control layer and the liquid crystal molecules in the second liquid crystal layer of the second viewing angle control layer are positioned at an initial angle

FIG. 4

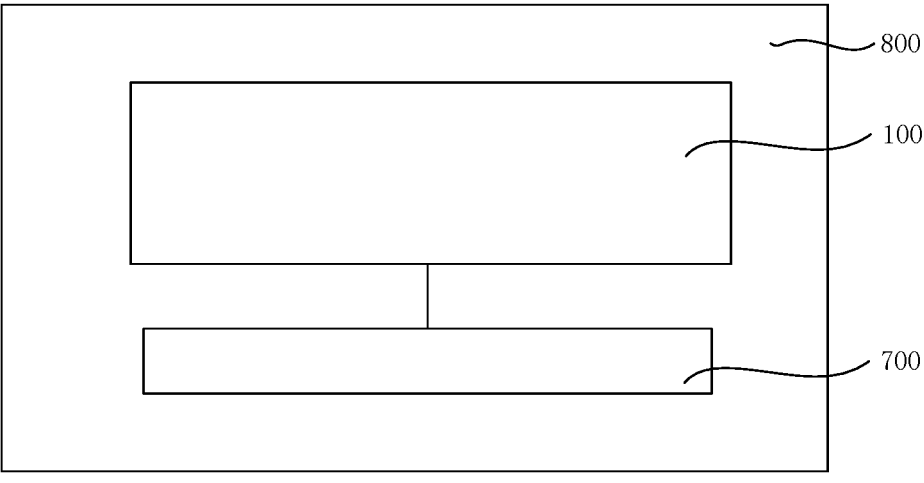

FIG. 5

DISPLAY MODULE, DRIVING METHOD, AND DISPLAY DEVICE

CROSS-REFERENCE TO RELATED APPLICATIONS

This application claims the priority and benefit of Chinese patent application number 2023103424635, titled "Display Module, Driving Method, and Display Device" and filed Apr. 3, 2023 with China National Intellectual Property Administration, the entire contents of which are incorporated herein by reference.

TECHNICAL FIELD

This application relates to the field of display technology, in particular to a display module, a driving method and a display device.

BACKGROUND

The description provided in this section is intended for the mere purpose of providing background information related to the present application but doesn't necessarily constitute prior art.

With the continuous development of display technology, the viewing angle of the display panel is getting increasingly wider. The viewing angle of a current display panel is close to 180 degrees, and users can watch the content displayed on the display panel from various angles, basically realizing a viewing experience without dead angles. However, in public places, due to the increased viewing angle, it also brings unnecessary troubles to the user's privacy leakage.

At present, in order to avoid the leakage of privacy, an anti-peeping film may be added to the display screen to achieve the convergence of the viewing angle. However, while effectively preventing peeping, it also brings about the problems of decreased brightness of the display panel, hence poor display effect. Furthermore, the anti-peeping film is only capable of one-way anti-peeping. When the user needs to share the displayed content with other users, it is impossible to switch from the anti-peeping mode back to the normal mode, thus reducing the user experience.

SUMMARY

In view of the above, it is a purpose of this application to provide a display module, a driving method, and a display device, where by setting a first viewing angle control layer and a second viewing angle control layer, the display module can be switched between the anti-peeping mode and the wide viewing angle mode, so as to meet the user's use requirements and improve the user's use experience.

The present application discloses a display module, which includes a display panel, a backlight module, an upper polarizer and a lower polarizer. The upper polarizer is arranged on a light-emitting surface of the display panel. The lower polarizer is arranged on a light incident surface of the display panel. An absorption axis of the upper polarizer is not equal to an absorption axis of the lower polarizer. A light emitting surface of the backlight module is disposed adjacent to the light incident surface of the display panel. The display module further includes a light valve regulator. The light valve regulator is arranged between the light incident surface of the display panel and the light emitting surface of the backlight module. The light valve regulator includes a first regulating electrode, a first viewing angle control layer, a second viewing angle control layer, a second regulating electrode and a first polarizer. The first regulating electrode is set adjacent to the display panel. The first viewing angle control layer is disposed on a side of the first regulating electrode facing away from the display panel. The first viewing angle control layer includes a light focusing layer and a first liquid crystal layer that are alternately arranged. The second viewing angle control layer is disposed on a side of the first viewing angle control layer facing away from the first regulating electrode. The second viewing angle control layer includes a transparent layer and a second liquid crystal layer that are alternately arranged. The second regulating electrode is disposed on a side of the second viewing angle control layer facing away from the first viewing angle control layer. The second regulating electrode and the first regulating electrode form an electric field for controlling the first liquid crystal layer and the second liquid crystal layer. The first polarizer is disposed on a side of the second regulating electrode facing away from the second viewing angle control layer. An absorption axis of the first polarizer is the same as the absorption axis of the upper polarizer. When the first regulating electrode and the second regulating electrode are energized, the liquid crystal molecules in the first liquid crystal layer of the first viewing angle control layer and in the second liquid crystal layer of the second viewing angle control layer are rotated, so that the light emitted by the backlight module passes through the light valve regulator and then all enters the display panel. When the first regulating electrode and the second regulating electrode are not energized, the liquid crystal molecules in the first liquid crystal layer of the first viewing angle control layer and the second liquid crystal layer of the second viewing angle control layer are in an initial state, the light emitted by the backlight module is partially emitted into the display panel after passing through the light valve regulator.

In some embodiments, the light focusing layer includes a transparent substrate. The transparent substrate comprises a hollow hole, and an opening of the hollow hole is located on the side of the transparent substrate adjacent to the first regulating electrode, and a side wall of the hollow hole is set in an arc shape. The transparent substrate focuses the light perpendicularly incident on the light focusing layer to the opening to exit.

In some embodiments, the side of the first liquid crystal layer adjacent to the adjacent light focusing layer is obliquely arranged. The width of the end of the first liquid crystal layer adjacent to the first regulating electrode is smaller than the width of the end of the first liquid crystal layer adjacent to the second regulating electrode.

In some embodiments, the side of the first liquid crystal layer adjacent to the adjacent light focusing layer is obliquely arranged. The width of the end of the first liquid crystal layer adjacent to the first regulating electrode is greater than the width of the end of the first liquid crystal layer adjacent to the second regulating electrode.

In some embodiments, the first liquid crystal layer is filled with a negative liquid crystal molecule, and the second liquid crystal layer is filled with a positive liquid crystal molecule. An alignment film is arranged at each of the end of the first liquid crystal layer adjacent to the first regulating electrode and the end facing away from the first regulating electrode. An initial position of the liquid crystal molecules of the first liquid crystal layer is 90°. An alignment film is arranged at each of the end of the second liquid crystal layer adjacent to the second regulating electrode and the end facing away from the second regulating electrode. An initial position of the liquid crystal molecules of the second liquid crystal layer is 0°.

In some embodiments, an absorption axis of the first polarizer is 0°, an absorption axis of the lower polarizer is 90°, and an absorption axis of the upper polarizer is 0°.

In some embodiments, the light focusing layer of the first viewing angle control layer is disposed corresponding to the second liquid crystal layer of the second viewing angle control layer. The first liquid crystal layer of the first viewing angle control layer is disposed corresponding to the transparent layer of the second viewing angle control layer.

In some embodiments, when the first regulating electrode and the second regulating electrode are energized to form an electric field, the liquid crystal molecules in the second liquid crystal layer are rotated to the range between 30° and 60°, and the liquid crystal molecules in the first liquid crystal layer are rotated to the range between 30° and 60°.

The present application further discloses a driving method, which is applied to the above-mentioned display module, the driving method including:

applying an electric field with a set intensity between the first regulating electrode and the second regulating electrode, so that the liquid crystal molecules of the first liquid crystal layer of the first viewing angle control layer and the liquid crystal molecules of the second liquid crystal layer of the second viewing angle control layer are positioned at a set angle;

applying no electric field between the first regulating electrode and the second regulating electrode, so that the liquid crystal molecules of the first liquid crystal layer of the first viewing angle control layer and the liquid crystal molecules of the second liquid crystal layer of the second viewing angle control layer are at positioned at an initial angle;

wherein when the display module is in the anti-peeping mode, the first regulating electrode and the second regulating electrode are not energized, and the liquid crystal molecules in the first liquid crystal layer of the first viewing angle control layer and the second liquid crystal layer of the second viewing angle control layer are in an initial state, and the light emitted by the backlight module is partially emitted into the display panel after passing through the light valve regulator;

when the display module is in the wide viewing angle mode, the first regulating electrode and the second regulating electrode are energized, and the liquid crystal molecules in the first liquid crystal layer of the first viewing angle control layer and the second liquid crystal layer of the second viewing angle control layer are rotated, and the light emitted by the backlight module passes through the light valve regulator and then all enters the display panel.

The present application further discloses a display device, which includes a driving circuit and the above-mentioned display module, where the driving circuit drives the display module.

In this application, by controlling whether the first regulating electrode and the second regulating electrode in the light valve regulator are energized or not, the rotation of the liquid crystal molecules of the first liquid crystal layer and the second liquid crystal layer in the light valve regulator is controlled, thereby adjusting the range of the area that can be emitted by light in the light valve regulator, so as to realize switch between the anti-peep mode and the wide viewing angle mode of the display module, so that the user can switch between the anti-peep mode and the wide viewing angle mode according to his own viewing needs, thereby meeting the user's use requirements and improving the user's use experience.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

FIG. 4 is a flowchart of a driving method according to a second embodiment of the present application.

FIG. 5 is a schematic diagram of a display device according to a third embodiment of the present application.

Figure 1:
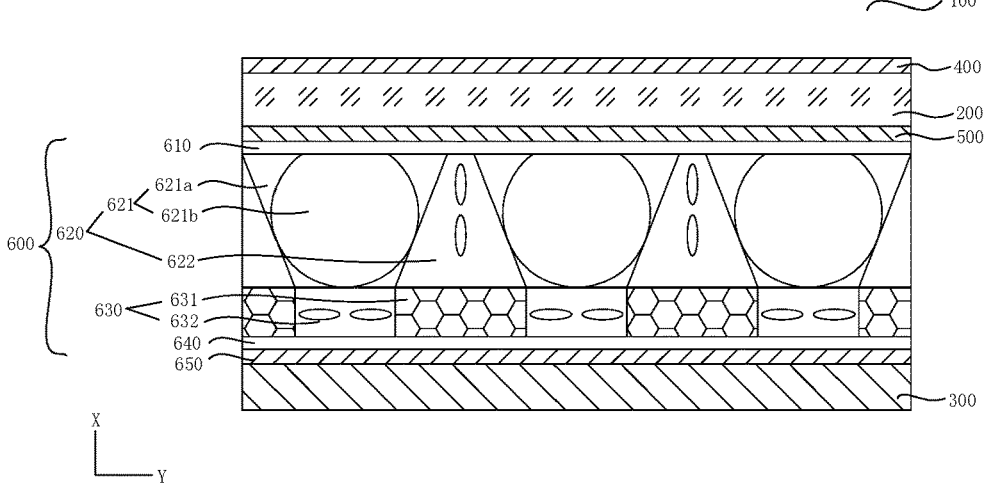
FIG. 1 is a schematic diagram of a display module according to a first embodiment of the present application.

In the drawings: 100, display module; 200, display panel; 300, backlight module; 400, upper polarizer; 500, lower polarizer; 600, light valve regulator; 610, first regulating electrode; 620, first viewing angle control layer; 621, light focusing layer; 621*a*, transparent substrate; 621*b*, hollow hole; 622, first liquid crystal layer; 630, second viewing angle control layer; 631, transparent layer; 632, second liquid crystal layer; 640, second regulating electrode; 650, first polarizer; 700, driving circuit; 800, display device.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application can be understood depending on specific contexts.

The present application will be described in detail below with reference to the accompanying drawings and optional embodiments. It should be noted that, should no conflict is present, the various embodiments or technical features described below can be combined arbitrarily to form new embodiments.

As shown in FIG. 1, as a first embodiment of the present application, a display module 100 is disclosed. The display module 100 includes a display panel 200, a backlight module 300, an upper polarizer 400, a lower polarizer 500 and a light valve regulator 600. The upper polarizer 400 is disposed on a light emitting surface of the display panel 200. The lower polarizer 500 is disposed on a light incident surface of the display panel 200. A light emitting surface of the backlight module 300 is disposed adjacent to the light incident surface of the display panel 200. The light valve regulator 600 is disposed between the light incident surface of the display panel 200 and the light emitting surface of the backlight module 300. The light valve regulator 600 includes a first regulating electrode 610, a first viewing angle control layer 620, a second viewing angle control layer 630, a second regulating electrode 640, and a first polarizer 650. The first regulating electrode 610 is disposed adjacent to the display panel 200. The first viewing angle control layer 620 is disposed on a side of the first regulating electrode 610 facing away from the display panel 200. The first viewing angle control layer 620 includes a light focusing layer 621 and a first liquid crystal layer 622 that are alternately arranged. The second viewing angle control layer 630 is disposed on a side of the first viewing angle control layer 620 facing away from the first regulating electrode 610. The second viewing angle control layer 630 includes a transparent layer 631 and a second liquid crystal layer 632 that are alternately arranged. The second regulating electrode 640 is disposed on a side of the second viewing angle control layer 630 facing away from the first viewing angle control layer 620. The second regulating electrode 640 and the first regulating electrode 610 form an electric field for controlling the first liquid crystal layer 622 and the second liquid crystal layer 632. The first polarizer 650 is disposed on a side of the second regulating electrode 640 facing away from the second viewing angle control layer 630. By controlling whether the first regulating electrode 610 and the second regulating electrode 640 are energized or not, the display module 100 is switched between the anti-peeping mode and the wide viewing angle mode. The transparent layer 631 may be a glass layer, or may be made of other transparent materials, which is not limited here, and the designer can choose and design according to the actual situation.

When the display module 100 is in the anti-peeping mode, no electric field is applied between the first regulating electrode 610 and the second regulating electrode 640, that is, no electricity is supplied. Both the first liquid crystal layer 622 in the first viewing angle control layer 620 and the second liquid crystal layer 632 in the second viewing angle control layer 630 are each in an initial state. The light emitted from the backlight module 300 first enters the first polarizer 650, and after passing through the first polarizer 650, it is converted into polarized light at a corresponding angle, and then the polarized light enters the second viewing angle control layer 630. Light entering the transparent layer 631 of the second viewing angle control layer 630 can directly pass through the transparent layer 631 and enter the first viewing angle control layer 620. When the light entering the second liquid crystal layer 632 in the second viewing angle control layer 630 passes through the second liquid crystal layer 632, the light will be twisted by the liquid crystal in the second liquid crystal layer 632, and then enter the first viewing angle control layer 630. Since the first liquid crystal layer 622 is in an initial state when no electric field is applied, the light entering the first liquid crystal layer 622 in the first viewing angle control layer 620 will not be twisted, so that the light at the first liquid crystal layer 622 cannot exit the light valve regulator 600, that is, it cannot pass through the lower polarizer 500, and the area of the display panel 200 corresponding to the first liquid crystal layer 622 is in an opaque dark state. The light entering the light focusing layer 621 in the first viewing angle control layer 620 will be concentrated and focused by the light focusing layer 621 and then exit the light valve regulator 600, so that the light incident into the display panel 200 is arranged at intervals thereby forming an anti-peeping mode, so that the user can only view the display content at the viewing angle where the light incident surface of the display panel 200 is vertical, and cannot view the display content at other viewing angles.

When the display module 100 is in the wide viewing angle mode, an electric field is applied between the first regulating electrode 610 and the second regulating electrode 640. Both the liquid crystal molecules in the first liquid crystal layer 622 in the first viewing angle control layer 620 and the liquid crystal molecules in the second liquid crystal layer 632 in the second viewing angle control layer 630 are rotated, and the rotation angle is related to the electric field strength. The light emitted from the backlight module 300 first enters the first polarizer 650, and after passing through the first polarizer 650, it is converted into polarized light at a corresponding angle, and then the polarized light enters the second viewing angle control layer 630. Light entering the transparent layer 631 of the second viewing angle control layer 630 can directly pass through the transparent layer 631 and enter the first viewing angle control layer 620. When the light entering the second liquid crystal layer 632 in the second viewing angle control layer 630 passes through the second liquid crystal layer 632, the light will be refracted by the liquid crystal molecules in the second liquid crystal layer 632 to form scattering, and then enter the first viewing angle control layer 620. Since the liquid crystal molecules in the first liquid crystal layer 622 are rotated, the light incident on the first liquid crystal layer 622 in the first viewing angle control layer 620 will also be refracted when passing through the liquid crystal molecules thus forming scattering. Regarding the light entering the light focusing layer 621 in the first viewing angle control layer 620, there will be vertically incident light and obliquely incident light. The vertically incident light will be concentrated and focused by the light focusing layer 621 and then exit the light valve regulator 600, while the obliquely incident light will be reflected and refracted by the light focusing layer 621 before exiting. In this way, the light will diverge in various directions when passing through the light valve regulator 600, and then pass through the lower polarizer 500 to enter the display panel 200, so that all positions of the display panel 200 can receive light, thereby forming a wide viewing angle mode, and users can watch the display content from various angles without affecting the viewing of the content.

In the display module 100 of this embodiment, the rotation of the liquid crystal molecules in the first liquid crystal layer 622 and the second liquid crystal layer 632 in the light valve regulator 600 is controlled by controlling whether the first regulating electrode 610 and the second regulating electrode 640 in the light valve regulator 600 are energized or not, so as to adjust the range of the area that can be emitted by light in the light valve regulator 600 thereby realizing the switching of the display module 100 between the anti-peeping mode and the wide viewing angle mode, so that users can switch between the anti-peeping mode and the wide viewing angle mode according to their own viewing needs to meet user needs and improve user experience. It should be noted that an electric field with a preset strength can be applied between the first regulating electrode 610 and the second regulating electrode 640, and the strength of the electric field corresponds to the rotation angle of the liquid crystal molecules, and the rotation of the liquid crystal can be adjusted by adjusting the strength of the electric field.

Further, the inside of the first liquid crystal layer 622 is filled with a negative liquid crystal, and the inside of the second liquid crystal layer 632 is filled with a positive liquid crystal. An alignment film is arranged at each of the end of the first liquid crystal layer 622 adjacent to the first regulating electrode 610 and the end facing away from the first regulating electrode 610. The initial position of the liquid crystal molecules of the first liquid crystal layer 622 is 90°. An alignment film is arranged at each of the end of the second liquid crystal layer 632 adjacent to the second regulating electrode 640 and the end facing away from the second regulating electrode 640. The initial position of the liquid crystal molecules of the second liquid crystal layer 632 is 0°. The alignment film may be made of polyimide (Polyimide, PI) alignment film. Under the action of the alignment film, when the first regulating electrode 610 and the second regulating electrode 640 are not energized, the initial position of the liquid crystal molecules of the first liquid crystal layer 622 is 90°, and the initial position of the liquid crystal molecules of the second liquid crystal layer 632 is 0°. When the first regulating electrode 610 and the second regulating electrode 640 are energized to form an electric field, the liquid crystal molecules in the second liquid crystal layer 632 are rotated to between 30° and 60°, and the liquid crystal molecules in the first liquid crystal layer 622 are rotated to between 30° and 60°. The optimum liquid crystal rotation angle of the first liquid crystal layer 622 is 45°, and the optimum liquid crystal rotation angle of the second liquid crystal layer 632 is 45°. An absorption axis of the first polarizer 650 is 0°, an absorption axis of the lower polarizer 500 is 90°, and an absorption axis of the upper polarizer 400 is 0°. The first liquid crystal layer 622 may be designed as a vertical alignment (VA) display structure, and the second liquid crystal layer 632 may be designed as a twisted nematic (TN) display structure.

In this embodiment, the light focusing layer 621 of the first viewing angle control layer 620 is disposed corresponding to the second liquid crystal layer 632 of the second viewing angle control layer 630, the first liquid crystal layer 622 of the first viewing angle control layer 620 is disposed corresponding to the transparent layer 631 of the second viewing angle control layer 630, so that when the display module 100 is in the wide viewing angle mode, the light emitted by the backlight module 300 can all change the polarization angle to exit the lower polarizer 500 to provide light for the display panel 200, so that the display panel 200 is put in the wide viewing angle mode to display. It should be noted that the widths of the light focusing layer 621 and the second liquid crystal layer 632 may be equal or not, and the widths of the first liquid crystal layer 622 and the transparent layer 631 may be equal or not. The light passing through the second liquid crystal layer 632 only needs to partially pass through the light focusing layer 621, or partially pass through the first liquid crystal layer 622, while the light passing through the transparent layer 631 only needs to partially pass through the first liquid crystal layer 622, and can also partially pass through the light focusing layer 621, that is, there may be a partial misalignment between the first liquid crystal layer 622 and the transparent layer 631, and there may also be a partial misalignment between the light focusing layer 621 and the second liquid crystal layer 632, where designers can choose a design according to actual needs, and there is no limitation here.

Figure 3:
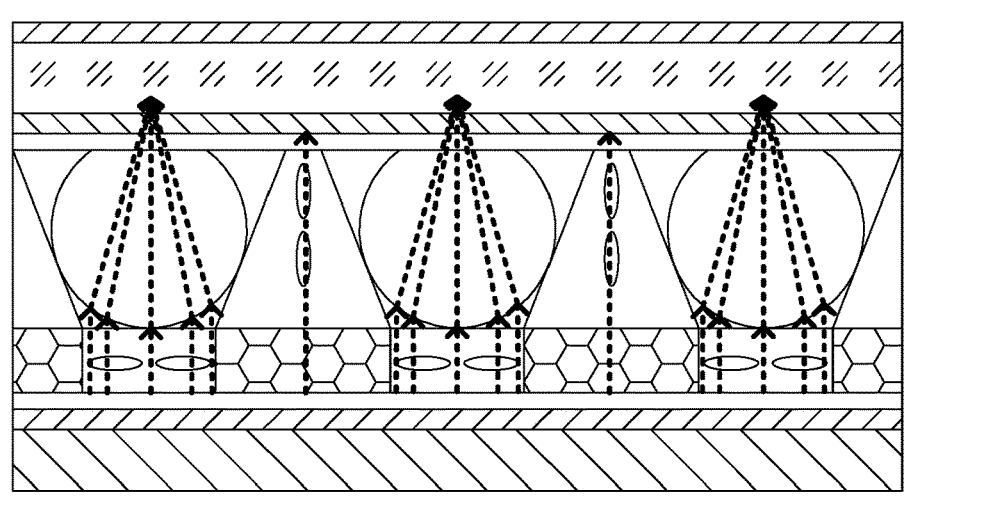
FIG. 3 is a schematic diagram of a light path of a display module in an anti-peeping mode according to the first embodiment of the present application.

As shown in FIG. 3, when the display module 100 is in the anti-peeping mode, the first regulating electrode 610 and the second regulating electrode 640 are not energized, and no electric field is formed between the first regulating electrode 610 and the second regulating electrode 640, and the liquid crystal molecules in the first liquid crystal layer 622 and the liquid crystal molecules in the second liquid crystal layer 632 both maintain their initial positions. That is, the liquid crystal molecules in the first liquid crystal layer 622 maintain 90°, and the liquid crystal molecules in the second liquid crystal layer 632 maintain 0°. When the light from the backlight module 300 passes through the first polarizer 650, it is converted into 90° polarized light by the first polarizer 650 and then continues to enter the second viewing angle control layer 630. When light enters the second liquid crystal layer 632 of the second viewing angle control layer 630, since the liquid crystal molecules in the second liquid crystal layer 632 maintain 0°, the light will be twisted under the action of the liquid crystal molecules in the second liquid crystal layer 632, so that the polarization angle of the light changes to 0° and then continues to enter the light focusing layer 621 of the first viewing angle control layer 620, then under the action of the light focusing layer 621, the light will be concentrated and focused, and then exit the light valve regulator 600. When light enters the transparent layer 631 of the second viewing angle control layer 630, the polarization angle of the light will not change and the light will continue to enter the first liquid crystal layer 622 of the first viewing angle control layer 620. Since the liquid crystal molecules of the first liquid crystal layer 622 remain at 90°, the polarization angle of the light will not change and the light will continue to exit the light valve regulator 600. Because the absorption axis of the lower polarizer 500 is 90°, after light passes through the transparent layer 631 of the second viewing angle control layer 630 and the first liquid crystal layer 622 of the first viewing angle control layer 620, both the liquid crystal molecules of the first liquid crystal layer 622 and the transparent layer 631 will not change the polarization angle of the light, so that the light cannot exit the lower polarizer 500, so that the area of the display panel 200 corresponding to the transparent layer 631 is displayed in a dark state compared with the area of the display panel 200 corresponding to the second liquid crystal layer 632. That is, the brightness of the area of the display panel 200 corresponding to the transparent layer 631 will be smaller than the brightness of the area of the display panel corresponding to the second liquid crystal layer.

Figure 2:
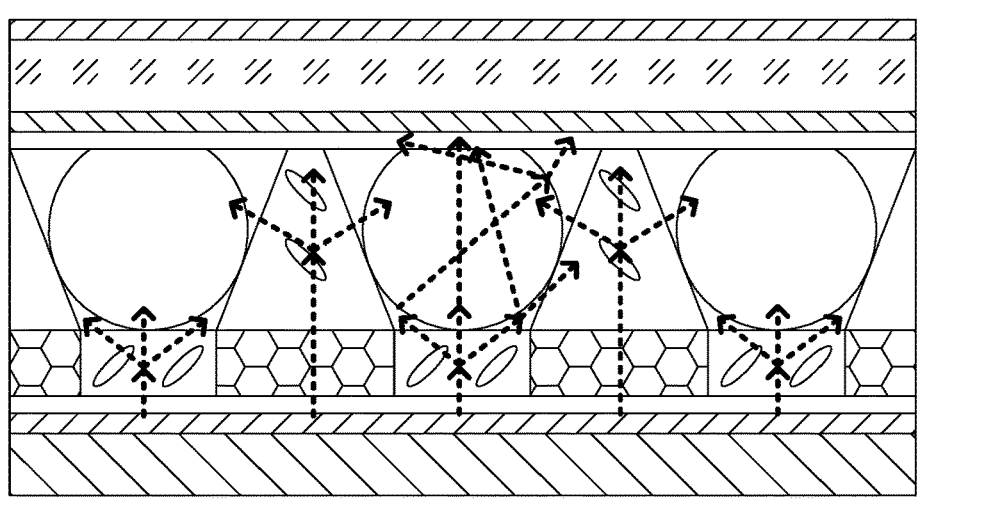
FIG. 2 is a schematic diagram of a light path of a display module in a wide viewing angle mode according to the first embodiment of the present application.

As shown in FIG. 2, when the display module 100 is in the wide viewing angle mode, the first regulating electrode 610 and the second regulating electrode 640 are energized, an electric field is formed between the first regulating electrode 610 and the second regulating electrode 640, and the liquid crystal molecules in the first liquid crystal layer 622 are rotated to 45°, and the liquid crystal molecules in the second liquid crystal layer 632 are rotated to 45°. When the light from the backlight module 300 passes through the first polarizer 650, it is converted into 90° polarized light by the first polarizer 650 and then continues to enter the second viewing angle control layer 630. When the light enters the second liquid crystal layer 632 of the second viewing angle control layer 630, since the liquid crystal molecules in the second liquid crystal layer 632 are rotated to 45°, under the action of the second liquid crystal layer 632, the light will be refracted and scattered and then enters the first viewing angle control layer 620 and the adjacent transparent layer 631. When light enters the transparent layer 631 of the second viewing angle control layer 630, the polarization angle of the light will not change and the light will continue to enter the first viewing angle control layer 620. As for the light incident on the first liquid crystal layer 622 in the first viewing angle control layer 620, since the liquid crystal molecules in the first liquid crystal layer 622 are rotated to 135°, the light will be refracted under the action of the first liquid crystal layer 622 to form scattering and enter the adjacent light focusing layer 621 and the lower polarizer 500. Of the light entering the light focusing layer 621 in the first viewing angle control layer 620, there will be vertically incident light and obliquely incident light. The vertically incident light will be concentrated and focused under the action of the light focusing layer 621, and then exit the light valve regulator 600. The obliquely incident light will be reflected and refracted by the light focusing layer 621 before exiting. Subsequently, since the absorption axis of the lower polarizer 500 is 90°, the polarization angle of the light changes after being refracted by the first liquid crystal layer 622 and the second liquid crystal layer 632. Thus, all the scattered light can exit the lower polarizer 500, so that there is light in each region of the display panel 200, and the display panel 200 has light scattered along various angles, so that the display module 100 can display in a wide viewing angle mode.

Further, the light focusing layer 621 includes a transparent substrate 621a. The transparent substrate 621a defines a hollow hole 621b. The opening of the hollow hole 621b is located on the side of the transparent substrate 621a adjacent to the first regulating electrode 610. The side wall of the hollow hole 621b is set in an arc shape, so as to focus the light vertically incident on the light focusing layer 621 to the opening to exit. In contrast, the light rays obliquely incident on the light focusing layer 621 will be refracted and then emitted. The opening of the hollow hole 621b may be smaller than the area of the transparent substrate 621a, and the centerline of the hollow hole 621b may coincide with the centerline of the transparent substrate 621a, so that the light perpendicularly incident on the light focusing layer 621 can be focused to the center of the transparent substrate 621a, so that the light intensity of the area of the display panel 200 corresponding to the light focusing layer 621 is greater than the light intensity of the area of the display panel 200 corresponding to the first liquid crystal layer 622, so as to achieve the anti-peeping effect. The transparent substrate 621a may be high refractive glass. After the light passes through the second viewing angle control layer 630 and is vertically incident on the side wall of the hollow hole 621b in the high refractive glass, the light is converged at the opening of the hollow hole 621b under the high refraction effect of the high refractive glass, so as to play the role of concentrating the light. The transparent substrate 621a may also be other transparent materials, which are not limited here, and the designer can select a design according to the actual situation. It should be noted that, when the transparent substrate 621a is glass, the refractive index of the glass may be selected to be 1.9 or higher.

As shown in FIG. 1, the side of the first liquid crystal layer 622 adjacent to the adjacent light focusing layer 621 is obliquely arranged. The width of the end of the first liquid crystal layer 622 adjacent to the first regulating electrode 610 is smaller than the width of the end of the first liquid crystal layer 622 adjacent to the second regulating electrode 640, so that the first liquid crystal layer 622 forms a narrow top and a wide bottom, so that the range of light incident on the light focusing layer 621 is controlled, and the difference between the area of the display panel 200 corresponding to the light focusing layer 621 and the area of the display panel 200 corresponding to the first liquid crystal layer 622 is more apparent, making the anti-peeping mode of the display module 100 more obvious. Of course, the first liquid crystal layer 622 may also form a structure that is relatively wider at the top and relatively narrower at the bottom, namely the width of the end of the first liquid crystal layer 622 adjacent to the first regulating electrode 610 is larger than the width of the end of the first liquid crystal layer 622 adjacent to the second regulating electrode 640, so that the range of the light incident on the light focusing layer 621 is larger than the range of the light entering the first liquid crystal layer 622, so that the intensity of light focused by the light focusing layer 621 is relatively greater, and the difference between the area of the display panel 200 corresponding to the light focusing layer 621 and the area of the display panel 200 corresponding to the first liquid crystal layer 622 is more obvious, making the anti-peeping mode of the display module 100 more obvious. It should be noted that the width direction of the first liquid crystal layer 622 is the direction of the Y axis as shown in FIG. 1, and the structure of the first liquid crystal layer 622 can be selected and designed by the designer according to the actual situation, which is not limited herein.

As shown in FIG. 4, as a second embodiment of the present application, a driving method is disclosed, where the driving method is applied to the above-mentioned display module, and the driving method includes:

applying an electric field with a set intensity between the first regulating electrode and the second regulating electrode, so that the liquid crystal molecules of the first liquid crystal layer of the first viewing angle control layer and the liquid crystal molecules of the second liquid crystal layer of the second viewing angle control layer are positioned at a set angle;

applying no electric field between the first regulating electrode and the second regulating electrode, so that the liquid crystal molecules of the first liquid crystal layer of the first viewing angle control layer and the liquid crystal molecules of the second liquid crystal layer of the second viewing angle control layer are at positioned at an initial angle;

wherein when the display module is in the anti-peeping mode, no electric field is applied between the first regulating electrode and the second regulating electrode, the liquid crystal molecules in the first liquid crystal layer of the first viewing angle control layer and the second liquid crystal layer of the second viewing angle control layer are in an initial state, and the light emitted by the backlight module is partially emitted into the display panel after passing through the light valve regulator; when the display module is in the wide viewing angle mode, the first regulating electrode and the second regulating electrode are energized, an electric field is formed between the first regulating electrode and the second regulating electrode, and the liquid crystal molecules in the first liquid crystal layer of the first viewing angle control layer and in the second liquid crystal layer of the second viewing angle control layer are rotated, and the light emitted by the backlight module passes through the light valve regulator and then all enters the display panel.

By controlling whether the first regulating electrode and the second regulating electrode in the light valve regulator are energized or not, the rotation of the liquid crystal molecules of the first liquid crystal layer and the second liquid crystal layer in the light valve regulator is controlled, thereby adjusting the range of the area that can be emitted by light in the light valve regulator to realize the switch between the anti-peep mode and the wide viewing angle mode of the display module, so that users can switch between the anti-peep mode and the wide viewing angle mode according to their own viewing needs, thus meeting the user's needs and improving the user's experience.

As shown in FIG. 5, as a third embodiment of the present application, a display device 800 is disclosed. The display device 800 includes a driving circuit 700 and the display module 100 as described above. The driving circuit 700 drives the display module 100. In the display device 800 of this embodiment, the rotation of the liquid crystal molecules in the first liquid crystal layer 622 and the second liquid crystal layer 632 in the light valve regulator 600 are controlled by controlling whether the first regulating electrode 610 and the second regulating electrode 640 in the light valve regulator 600 are energized or not, thereby adjusting the range of the area that can be emitted by light in the light valve regulator 600, so as to realize the switching of the display device 800 between the anti-peeping mode and the wide viewing angle mode, so that users can switch between the anti-peeping mode and the wide viewing angle mode according to their own viewing needs, thus meeting the user's needs and improving the user experience.

It should be noted that the limitations of various operations involved in this solution will not be deemed to limit the order of the operations, provided that they do not affect the implementation of the specific solution, so that the operations written earlier may be executed earlier or they may also be executed later or even at the same time. As long as the solution can be implemented, they should all be regarded as falling in the scope of protection of this application.

The technical solutions of the present application can be widely used in various display panels, such as TN (Twisted Nematic) display panels, IPS (In-Plane Switching) display panels, VA (Vertical Alignment) display panels, and MVA (Multi-Domain Vertical Alignment) display panels. Of course, other types of display panels, such as OLED (Organic Light-Emitting Diode) display panels, may also be applicable to the above solutions.

It should be noted that the inventive concept of the present application can be formed into many embodiments, but the length of the application document is limited and so these embodiments cannot be enumerated one by one. The technical features can be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A display module, comprising a display panel, a backlight module, an upper polarizer, and a lower polarizer; wherein the upper polarizer is arranged on a light-emitting surface of the display panel, and the lower polarizer is arranged on a light incident surface of the display panel; wherein an absorption axis of the upper polarizer is not equal to an absorption axis of the lower polarizer; wherein a light emitting surface of the backlight module is disposed adjacent to the light incident surface of the display panel; wherein the display module further comprises a light valve regulator arranged between the light incident surface of the display panel and the light emitting surface of the backlight module; wherein the light valve regulator comprises:

a first regulating electrode, arranged adjacent to the display panel;

a first viewing angle control layer, arranged on a side of the first regulating electrode facing away from the display panel, the first viewing angle control layer comprising a light focusing layer and a first liquid crystal layer that are alternately arranged;

a second viewing angle control layer, arranged on a side of the first viewing angle control layer facing away from the first regulating electrode, the second viewing angle control layer comprising a transparent layer and a second liquid crystal layer that are alternately arranged;

a second regulating electrode, arranged on a side of the second viewing angle control layer facing away from the first viewing angle control layer, wherein the second regulating electrode and the first regulating electrode are used to form an electric field for controlling the first liquid crystal layer and the second liquid crystal layer; and a first polarizer, arranged on a side of the second regulating electrode facing away from the second viewing angle control layer, wherein an absorption axis of the first polarizer is identical with the absorption axis of the upper polarizer;

wherein in response to the first regulating electrode and the second regulating electrode being energized, liquid crystal molecules in the first liquid crystal layer of the first viewing angle control layer and in the second liquid crystal layer of the second viewing angle control layer are rotated, and light emitted by the backlight module is operative to pass through the light valve regulator before all entering the display panel; in response to the first regulating electrode and the second regulating electrode being not energized, the liquid crystal molecules in the first liquid crystal layer of the first viewing angle control layer and in the second liquid crystal layer of the second viewing angle control layer are positioned in an initial state, and the light emitted by the backlight module is partially emitted into the display panel after passing through the light valve regulator;

wherein the light focusing layer comprises a transparent substrate, wherein a hollow hole is defined in the transparent substrate, wherein the hollow hole comprises an opening that is located on a side of the transparent substrate adjacent to the first regulating electrode, and wherein the hollow hole comprises a side wall that has an arc shape;

wherein the transparent substrate is operative to focus the light that vertically enters the light focusing layer to the opening and allow the light to be emitted.

2. The display module as recited in claim 1, wherein a side of the first liquid crystal layer adjacent to an adjacent light focusing layer is obliquely arranged, and wherein a width of an end of the first liquid crystal layer adjacent to the first regulating electrode is less than a width of an end of the first liquid crystal layer adjacent to the second regulating electrode.

3. The display module as recited in claim 1, wherein a side of the first liquid crystal layer adjacent to an adjacent light focusing layer is obliquely arranged, and wherein a width of an end of the first liquid crystal layer adjacent to the first regulating electrode is greater than a width of an end of the first liquid crystal layer adjacent to the second regulating electrode.

4. The display module as recited in claim 1, wherein the first liquid crystal layer is filled with a negative liquid crystal, the second liquid crystal layer is filled with a positive liquid crystal, wherein an alignment film is arranged on each of an end of the first liquid crystal layer adjacent to the first regulating electrode and an end facing away from the first regulating electrode, wherein an initial position of the liquid crystal molecules in the first liquid crystal layer is 90°; wherein an alignment film is arranged on each of an end of the second liquid crystal layer adjacent to the second regulating electrode and an end facing from the second regulating electrode, and wherein an initial position of the liquid crystal molecules in the second liquid crystal layer is 0°.

5. The display module as recited in claim 1, wherein an absorption axis of the first polarizer is 0°, an absorption axis of the lower polarizer is 90°, and an absorption axis of the upper polarizer is 0°.

6. The display module as recited in claim 1, wherein the light focusing layer of the first viewing angle control layer is arranged corresponding to the second liquid crystal layer of the second viewing angle control layer, and wherein the first liquid crystal layer of the first viewing angle control layer is arranged corresponding to the transparent layer of the second viewing angle control layer.

7. The display module as recited in claim 4, wherein when the first regulating electrode and the second regulating electrode are energized to form the electric field, the liquid crystal molecules in the second liquid crystal layer are rotated to a range between 30° and 60°, and the liquid crystal molecules in the first liquid crystal layer are rotated to a range between 30° and 60°.

8. The display module as recited in claim 7, wherein a liquid crystal rotation angle of the first liquid crystal layer is 45°, and a liquid crystal rotation angle of the second liquid crystal layer is 45°.

9. The display module as recited in claim 6, wherein the light focusing layer and the second liquid crystal layer have an equal width.

10. The display module as recited in claim 6, wherein the first liquid crystal layer and the transparent layer have an equal width.

11. The display module as recited in claim 4, wherein the alignment film is a polyimide alignment film.

12. The display module as recited in claim 1, wherein the opening of the hollow hole has a less area than the transparent substrate, and wherein a centerline of the hollow hole coincides with a centerline of the transparent substrate.

13. The display module as recited in claim 1, wherein the transparent substrate is a high refractive glass, and wherein a refractive index of the high refractive glass is greater than 1.9.

14. The display module as recited in claim 1, wherein the transparent layer is a glass layer.

15. A display device, comprising a driving circuit and a display module, the driving circuit being configured to drive the display module, wherein the display module comprises a display panel, a backlight module, an upper polarizer, and a lower polarizer; wherein the upper polarizer is arranged on a light emitting surface of the display panel, and the lower polarizer is arranged on a light incident surface of the display panel; wherein an absorption axis of the upper polarizer is not identical with an absorption axis of the lower polarizer; wherein a light emitting surface of the backlight module is disposed adjacent to the light incident surface of the display panel; wherein the display module further comprises a light valve regulator arranged between the light incident surface of the display panel and the light emitting surface of the backlight module, wherein the light valve regulator comprises a first regulating electrode, a first viewing angle control layer, a second viewing angle control layer, a second regulating electrode, and a first polarizer; wherein the first regulating electrode is arranged adjacent to the display panel; wherein the first viewing angle control layer is disposed on a side of the first regulating electrode facing away from the display panel, wherein the first viewing angle control layer comprises a light focusing layer and a first liquid crystal layer that are alternately arranged; wherein the second viewing angle control layer is disposed on a side of the first viewing angle control layer facing away from the first regulating electrode, and wherein the second viewing angle control layer comprises a transparent layer and a second liquid crystal layer that are alternately arranged; wherein the second regulating electrode is arranged on a side of the second viewing angle control layer facing away from the first viewing angle control layer, and wherein the second regulating electrode and the first regulating electrode are operative to form an electric field used for controlling the first liquid crystal layer and the second liquid crystal layer; wherein the first polarizer is disposed on a side of the second regulating electrode facing away from the second viewing angle control layer, and wherein an absorption axis of the first polarizer is identical with the absorption axis of the upper polarizer;

wherein in response to the first regulating electrode and the second regulating electrode being energized, the liquid crystal molecules in the first liquid crystal layer of the first viewing angle control layer and the second liquid crystal layer of the second viewing angle control layer are rotated, and light emitted by the backlight module passes through the light valve regulator before all entering the display panel; in response to the first regulating electrode and the second regulating electrode being not energized, the liquid crystal molecules in the first liquid crystal layer of the first viewing angle control layer and the second liquid crystal layer of the second viewing angle control layer are positioned in an initial state, and the light emitted by the backlight module is partially emitted into the display panel after passing through the light valve regulator;

wherein the light focusing layer comprises a transparent substrate, wherein a hollow hole is defined in the transparent substrate, wherein the hollow hole comprises an opening that is located on a side of the transparent substrate adjacent to the first regulating electrode, and wherein the hollow hole comprises a side wall that has an arc shape;

wherein the transparent substrate is operative to focus the light that vertically enters the light focusing layer to the opening and allow the light to be emitted.

16. The display device as recited in claim 15, wherein a side of the first liquid crystal layer adjacent to an adjacent light focusing layer is obliquely arranged, and wherein a width of an end of the first liquid crystal layer adjacent to the first regulating electrode is less than a width of an end of the first liquid crystal layer adjacent to the second regulating electrode.

17. The display device as recited in claim 15, wherein a side of the first liquid crystal layer adjacent to an adjacent light focusing layer is obliquely arranged, wherein a width of an end of the first liquid crystal layer adjacent to the first regulating electrode is greater than a width of an end of the first liquid crystal layer adjacent to the second regulating electrode.

* * * * *